March 16, 1926. 1,577,161
R. H. BEAUMONT
HOIST
Filed Sept. 30, 1921
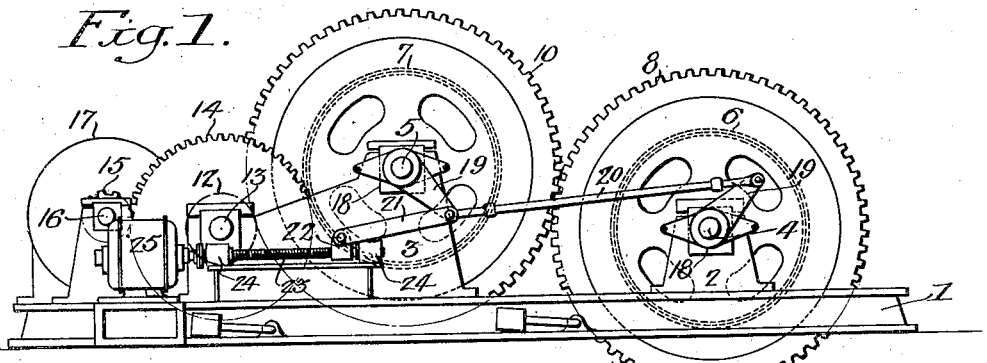
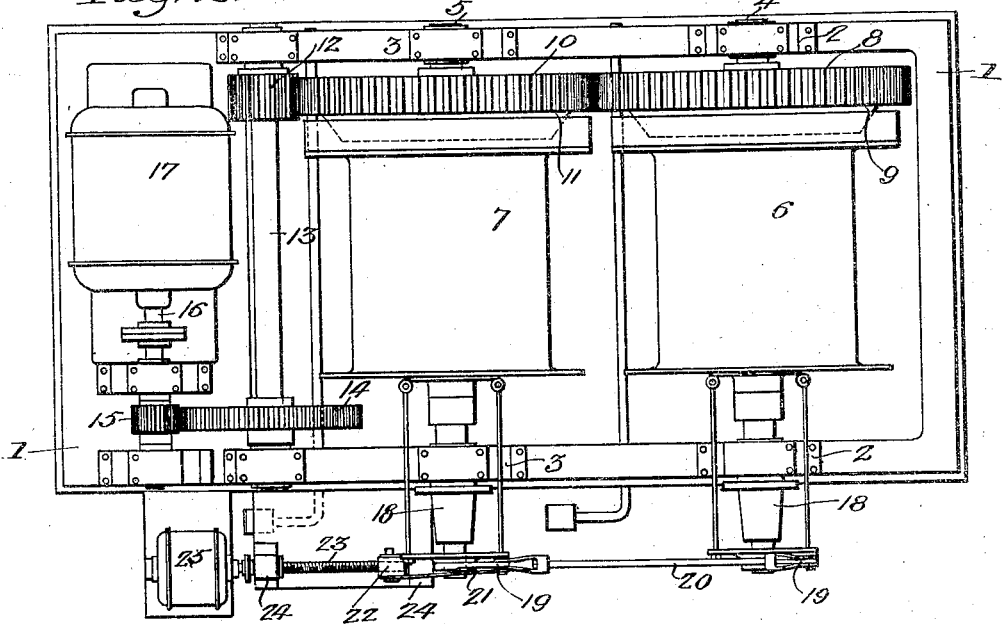
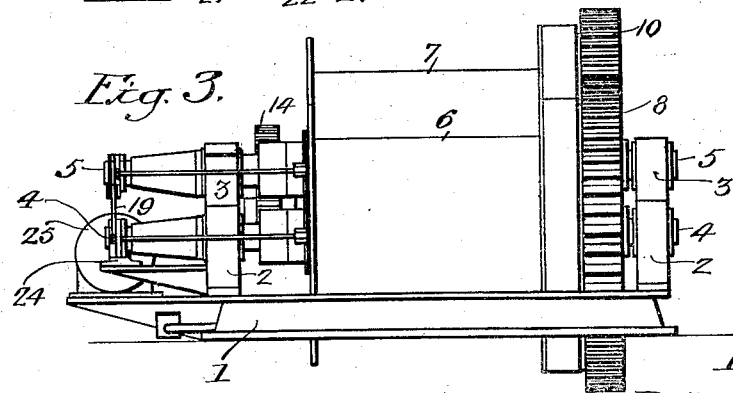
Inventor.
Robert H. Beaumont,
by his Attorneys,
Howson & Howson Patented Mar. 16, 1926.

1,577,161

UNITED STATES PATENT OFFICE.

ROBERT H. BEAUMONT, OF RADNOR, PENNSYLVANIA, ASSIGNOR TO R. H. BEAUMONT COMPANY, OF PHILADELPHIA, PENNSYLVANIA, A CORPORATION OF PENNSYLVANIA.

HOIST.

Application filed September 30, 1921. Serial No. 504,346.

*To all whom it may concern:*

Be it known that I, ROBERT H. BEAUMONT, a citizen of the United States, residing in Radnor, Delaware County, Pennsylvania, have invented certain Improvements in Hoists, of which the following is a specification.

My invention relates to certain improvements in hoists, especially of the tandem type in which two drums are used, one to pay out a rope and the other to wind a rope. Heretofore, the mechanism for throwing these drums into and out of action was operated by hand.

An important object of my invention is to provide an apparatus of the class described, wherein a motor in connection with lever mechanism is employed to move the drums of the hoisting apparatus into and out of action, respectively, the motor being of the type which will readily stall when the drum is moved into action.

My invention can also be used in connection with a single drum, or more than two drums, if found necessary.

In the accompanying drawings:

Fig. 1 is a side view of a tandem hoist illustrating my invention;

Fig. 2 is a plan view; and

Fig. 3 is an end view.

1 is the frame of the hoist. 2 and 3 are pedestals on which are mounted the shafts 4 and 5, respectively. Free to turn on the shaft 4 is a drum 6, and free to turn on the shaft 5 is a drum 7. Mounted on the shaft 4 is a gear wheel 8 having a beveled clutch face 9 adapted to a corresponding face on the drum. On the shaft 5 is a gear wheel 10 having a clutch face 11 adapted to a similar face on the drum 7. The two gears intermesh, as shown in Fig. 1. The gear 10 is driven from a pinion 12 on a shaft 13. On the opposite end of this shaft is a gear wheel 14 meshing with a pinion 15 on the shaft 16 of an electric motor 17.

18 are extended bearings on a line with the shafts 4 and 5, and located in these bearings are the devices for moving the drums 6 and 7 into and out of engagement with the friction surfaces of the gear wheels 8 and 10. These devices are of the ordinary construction and have not been shown in detail.

I provide a controlling mechanism for the two friction clutches which includes the two devices already mentioned and also levers 19, 19 on the respective shafts 4 and 5. These two levers are connected by a rod 20. In the present instance, one of the levers is connected by links 21 to a nut 22 through which extends a screw shaft 23 adapted to bearings 24 on the frame of the machine. This screw shaft is driven directly by a motor 25, which stalls when the coacting friction surfaces of the drums 6 and 7 and the gear wheels 8 and 10, respectively, are brought into engagement, as will appear more fully hereinafter. When the motor is driven in one direction, the nut 22 travels on the screw 23 and moves one drum into frictional contact with its gear wheel, while it withdraws the other drum owing to the fact that the levers are arranged so that one lever moves the mechanism in one direction while the other lever moves the mechanism in the opposite direction. When the motor 25 is reversed, the other drum is moved into frictional contact with its gear wheel while the other is withdrawn.

While I have described the operative connection between the driving motor and the drum controlling mechanism as employing a screw and nut arrangement, it is apparent that other forms of operative connections may be employed, as, for instance, bevel gear wheel or rack and spur mechanisms, all as will be readily understood by those skilled in the art.

The specific arrangement hereinabove described is capable of various changes and modifications without departing from the spirit and scope of my invention, and I desire, therefore, that only such limitations shall be imposed thereon as are indicated by the appended claims or as are demanded by the prior art.

I claim:

1. The combination in a hoisting apparatus, of two hoisting drums, power mechanism, means including two friction clutches for respectively connecting the drums with the power mechanism, controlling mechanism connected with the two friction clutches and movable in opposite directions to cause the engagement of one clutch and the release of the other clutch, and a reversible motor having a positively acting power connection with the said controlling mechanism to move it in either direction as desired, the said motor being constructed and adapted to stall when the said controlling mechanism reaches its limit of movement in either direction and the motor thereby serving to continue to apply force which serves to hold the corresponding friction clutch in engagement.

2. The combination of two friction clutches, controlling mechanism connected with the two friction clutches and movable in opposite directions to cause the engagement of one clutch and the release of the other clutch, and a reversible motor having a positively acting power connection with the said controlling mechanism to move it in either direction as desired, the said motor being constructed and adapted to stall when the said controlling mechanism reaches its limit of movement in either direction and the motor thereby serving to continue to apply force which serves to hold the corresponding friction clutch in engagement.

3. The combination of two friction clutches, controlling mechanism connected with the two friction clutches and movable in opposite directions to cause the engagement of one clutch and the release of the other clutch, a nut to which the said controlling mechanism is connected, a rotatable screw engaging the nut and fixed against endwise movement, and a motor having a positively acting power connection with the said screw to move it in either direction as desired, the said motor being constructed and adapted to stall when the said controlling mechanism reaches its limit of movement in either direction and the motor thereby serving to continue to apply force which serves to hold the corresponding friction clutch in engagement.

ROBERT H. BEAUMONT.